(12) United States Patent
Walsh (10) Patent No.: US 10,607,023 B2
(45) Date of Patent: *Mar. 31, 2020

(54) DIGITAL PAYLOAD SHARING PROTECTION

(71) Applicant: Microsoft Technology Licensing, LLC, Redmond, WA (US)

(72) Inventor: Blake Thomas Walsh, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 39 days.

This patent is subject to a terminal disclaimer.

(21) Appl. No.: 15/980,034

(22) Filed: May 15, 2018

(65) Prior Publication Data
US 2018/0260580 A1    Sep. 13, 2018

Related U.S. Application Data

(63) Continuation of application No. 15/145,709, filed on May 3, 2016, now Pat. No. 9,984,249.

(51) Int. Cl.
*H04L 29/06* (2006.01)
*G06F 21/62* (2013.01)

(52) U.S. Cl.
CPC ........ *G06F 21/6218* (2013.01); *H04L 63/102* (2013.01); *G06F 2221/2149* (2013.01)

(58) Field of Classification Search
None
See application file for complete search history.

(56) References Cited

U.S. PATENT DOCUMENTS

| | | | | |
|---|---|---|---|---|
| 8,161,069 B1* | 4/2012 | Wilder | ................. | G06Q 10/109 707/783 |
| 2005/0177516 A1* | 8/2005 | Vandewater | ............ | G06F 21/10 705/57 |
| 2009/0234909 A1* | 9/2009 | Strandell | ................. | H04L 67/20 709/203 |
| 2011/0041072 A1* | 2/2011 | Jeon | ...................... | G06F 16/958 715/739 |
| 2016/0182498 A1* | 6/2016 | Straka | ................... | G06F 3/0619 711/114 |
| 2016/0337844 A1* | 11/2016 | Hailpern | ................ | G06Q 30/02 |

\* cited by examiner

*Primary Examiner* — Shin-Hon (Eric) Chen
(74) *Attorney, Agent, or Firm* — Alleman Hall Creasman & Tuttle LLP (57) ABSTRACT

A computing device includes a network interface, a storage controller, a sharing tool and a protection service. The network interface communicatively couples the computing device to one or more computing devices. The storage controller is configured to access a plurality of digital payloads. Each of the digital payloads is associated with a plurality of access tags including content tags and context tags. The sharing tool is configured to share, with a recipient computing device via the network interface, a selected digital payload. The protection service configured to automatically control sharing of the selected digital payload with the recipient computing device based on determining that a prospective recipient associated with the recipient computing device has a work designation or a personal designation that is inconsistent with one or both of a context indicated by the context tags and a content indicated by the content tags.

19 Claims, 9 Drawing Sheets

DIGITAL PAYLOAD SHARING PROTECTION

CROSS REFERENCE TO RELATED APPLICATIONS

This application is a continuation of U.S. patent application Ser. No. 15/145,709, filed May 3, 2016, the entire contents of which is hereby incorporated herein by reference for all purposes.

BACKGROUND

A user may have different types of relationships with different contacts. For example, a user may have a group of friends that is separate from a group of co-workers. Moreover, some contacts may have more than one type of relationship with the user. For example, a particular contact may be both a friend and a co-worker. Such different types of relationships may affect a manner in which the user communicates with the different contacts.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A computing device includes a network interface, a storage controller, a sharing tool, and a protection service. The network interface communicatively couples the computing device to one or more computing devices. The storage controller is configured to access a plurality of digital payloads. Each of the digital payloads is associated with a plurality of access tags including content tags and context tags. The sharing tool is configured to share, with a recipient computing device via the network interface, a selected digital payload. The protection service configured to automatically control sharing of the selected digital payload with the recipient computing device based on determining that a prospective recipient associated with the recipient computing device has a work designation or a personal designation that is inconsistent with one or both of a context indicated by the context tags and a content indicated by the content tags.

DETAILED DESCRIPTION

A user may use a computer to share different information with a wide range of different recipients. In some scenarios, when a computing device has no sharing protections in place, a user accidentally may share information with an unintended recipient. In some such scenarios, the accident may have negative ramifications for the user. For example, the user accidentally may send personal content that is not suitable for a work environment to a co-worker. In another example, the user may accidentally leak secret work information to a personal contact.

Accordingly, the present description is directed to an approach for automatically controlling sharing of a digital payload with a prospective recipient based on respective category designations of the digital payload and the prospective recipient. More particularly, such an approach may recognize a condition in which a category designation of the prospective recipient is inconsistent with one or both of a context category and a content category of the digital payload, and automatically employ control measures to prevent the digital payload from accidentally being shared with the prospective recipient. Accordingly, such an approach may provide automatic control to ensure that a user is sharing digital payloads in a manner that is content and context appropriate.

Figure 1:
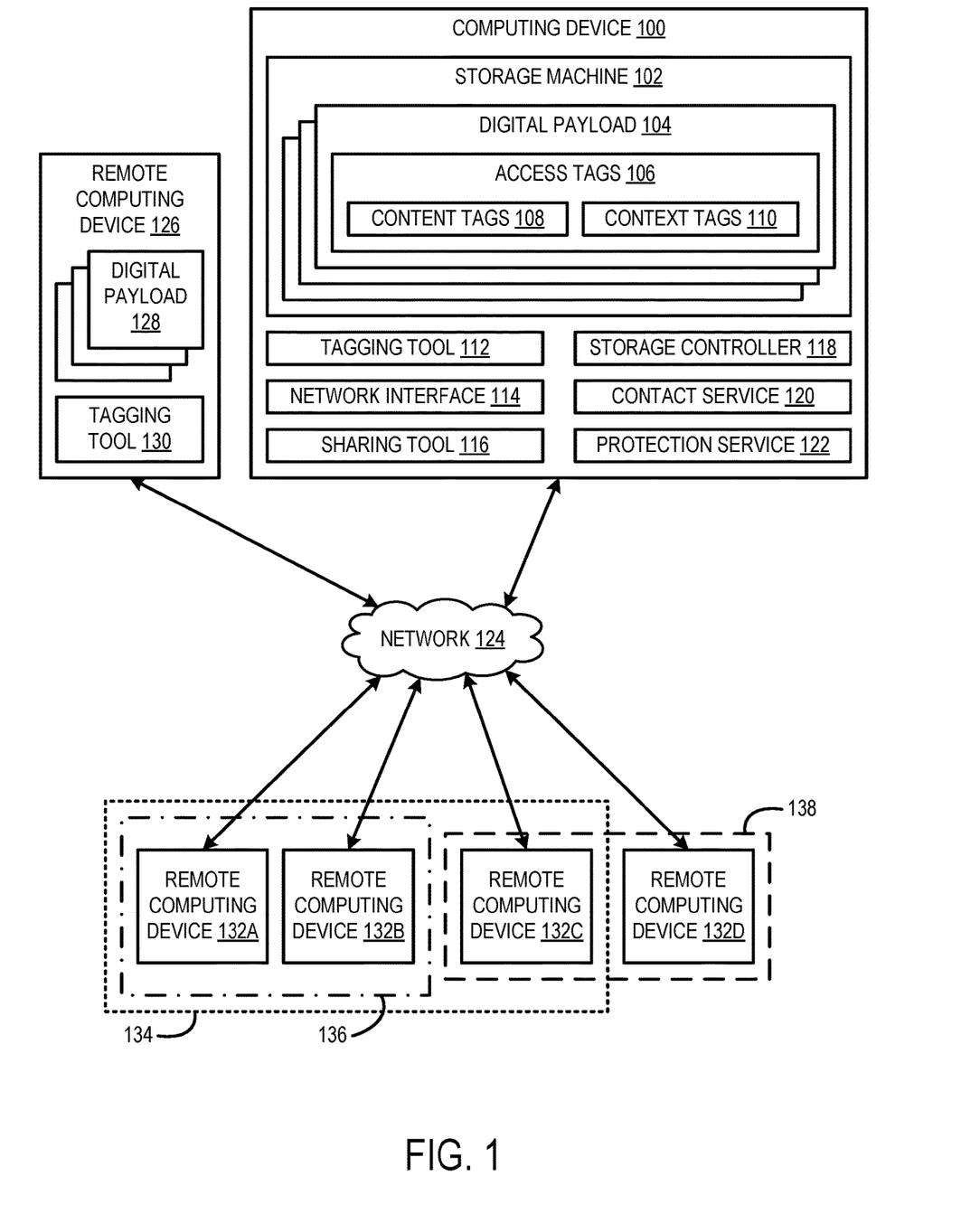
FIG. 1 shows a computing device configured to share digital payloads with one or more remote computing devices via a computer network.

FIG. 1 shows an example computing device 100 in simplified form. The computing device 100 is associated with a user and may be referred to herein as a user computing device. The computing device 100 includes a storage machine 102 configured to hold a plurality of network-shareable digital payloads 104. The plurality of digital payloads 104 may include any suitable digital, machine-readable form of a communication or a media content item that can be shared with one or more prospective recipients. Non-limiting examples of a digital payload may include, but are not limited to, a digital image or photograph, digital video (e.g., previously-generated video or a live video stream), digital audio (e.g., a voice call, a song, a spoken word or other sound track), a document (e.g., text file, presentation, spreadsheet, database), a file, and a message (e.g., an email, a short message service (SMS) or text message, a social network post/message).

The plurality of digital payloads 104 may be generated based on any suitable computing activity. For example, the user may generate a digital payload via the computing device 100. In another example, the computing device 100 may receive a digital payload from a remote computing device.

The computing device 100 optionally includes a tagging tool 112 configured to generate and/or modify a plurality of access tags 106 of one or more of the plurality of digital payloads 104. Each of the access tags 106 may describe a different characteristic of the corresponding digital payload 104. The access tags 106 may be used to determine if the digital payload 104 can be shared with a prospective recipient based on agreement between the access tags and a category designation of the prospective recipient. In particular, the plurality of access tags 106 include one or more content tags 108 and one or more context tags 110.

In some implementations, tags may be applied by other computing devices. As such, the description of tagging tool 112 is applicable to tagging tools of cooperating computing devices. For example, a remote computing device 126 different than computing device 100 may include a tagging tool 130 configured to generate tags for a plurality of digital payloads. In one example, the remote computing device 126 may be part of a cloud-based network storage device (e.g., an online photo storage service), and the tagging tool 130 is configured to generate tags for digital payloads that are saved on the remote computing device. Such tags may be used by computing device 100 when computing device 100 attempts to share the remotely stored digital payloads.

The content tags 108 describe characteristics of content included in the digital payload 104 that can be used to categorize the digital payload. The content tags 108 may include any suitable descriptive terms. In one example where the digital payload is a digital photograph, the content tags 108 may indicate image features recognized in the digital photograph. For example, a digital photograph of a group of people may include content tags that name each of the people in the digital photograph and/or that generally are labeled as "people." In another example, a digital photograph of a dog may include a content tags that is labeled as "dog." In another example, a digital photograph of a whiteboard with sketches may include content tags that are labeled "whiteboard" and "sketches."

In some implementations, the tagging tool 112 includes a machine-learning object-recognition engine to automatically identify objects in a digital photograph. The tagging tool 112 may identify a generic match (this object is a person) and/or a specific match (this object is my mother). A machine-learning object-recognition engine may be trained via supervised and/or unsupervised learning using any suitable machine learning approach (e.g., decision tree, boosted decision tree, neural network, etc.).

In another example where the digital payload includes some form of text, such as in a message or a document, the content tags 108 may include keywords included in the text of the digital payload. Different keywords may be associated with different categories that may be used to categorize the content of the digital payload. In one example, an email includes the name of a company or organization at which the user works, and the email is tagged with a content tag that is labeled with the company name. In another example, an SMS message includes the keywords "Seattle Mariners", and the SMS message is tagged with a particular content tag that is labeled "Seattle Mariners" as well as a general content tag that is labeled "baseball."

The context tags 110 describe characteristics of a context of the digital payload 104 that can be used to categorize the digital payload. The context tags 110 may include any suitable descriptive terms. Non-limiting examples of a context tag include, but are not limited to, a creation time, a creation date, a computing device on which the digital payload is created, a geographic location at which the digital payload was created, an identify of a creator of the digital payload, and a storage location on a computing device on which the digital payload is stored.

The tagging tool 112 may be configured to generate access tags 106 for the digital payloads 104 in any suitable manner. For example, the tagging tool 112 may generate an access tag 106 for a particular digital payload 104 when the digital payload is initially created. In another example, the tagging tool 112 may generate or modify an access tag 106 of a digital payload 104 based on the digital payload 104 being shared or used in another manner. For example, the tagging tool 112 may modify a context tag 110 of a digital payload 104 based on the digital payload 104 being updated and saved. In particular, the context tag 110 may indicate an identity of a user that updated the digital payload 104. In another example, the tagging tool 112 may generate or modify a tag of a digital payload based on a trigger, event, or condition. For example, the tagging tool 112 may modify a context tag 110 of a digital payload 104 based on the digital payload being moved to a different storage location of a computing device. In particular, the context tag 110 may indicate the storage address of the new storage location. In another example, the tagging tool 112 may modify a context tag 110 of a digital payload 104 based on the digital payload being moved between differently controlled portions of a computing device. For example, a digital payload 104 may be moved from a work controlled portion of the storage machine 102 to a personal controlled portion of the storage machine 102. The tagging tool 112 may modify the context tag 110 of the digital payload 104 to indicate this change in storage location. The tagging tool 112 may modify the tag because the differently controlled portions of the storage machine 102 may have different access restrictions that may affect sharing of digital payloads stored in the differently controlled portions. For example, a digital payload stored in the work controlled portion may be accessed by or shared with only work-designated users, and a digital payload stored in the personal controlled portion may be accessed by or shared with any type of user.

In some implementations, the tagging tool 112 further may be configured to generate and/or modify category tags for one or more contacts that may be prospective recipients of a digital payload. The tagging tool 112 may identify a contact in any suitable manner. In one example, the tagging tool 112 may look up a contact from a local list of contacts stored on the computing device 100. In another example, the tagging tool 112 may look up a contact from a remote list of contacts stored on a remote computing device, such as a work computing device, a social network computing device, or a computing device associated with another organization of the user. The tagging tool 112 may generate any suitable number of different category tags for a contact. Non-limiting examples of a category tag may include, but are not limited to, a co-worker, a friend, a club member, a sports team member, a family member, a client, a vendor, a church member, a political party member, a marital status, an age, a nationality, a race, and a sex. In one example of a category tag having associated sub-category tags, a particular contact may have a high-level co-worker tag as well as a plurality of sub-category tags including a works in the research and development department tag, a works as an analyst tag, a works in building C tag, and a works on the 7th floor of building C tag.

The tagging tool 112 may be configured to generate and/or modify a category tag for a contact in any suitable manner. In one example, the tagging tool 112 generates one or more tags for a contact based on user input directly indicating the category designations of the contact. In another example, the tagging tool 112 generates a category tag of a contact based on recognized information and/or characteristics of the contact. For example, the tagging tool 112 may generate a category tag of a contact by looking up information about the contact on a social network profile, a work profile, or another source of information about the contact. The tagging tool 112 may be configured to modify a category tag of a contact based on any suitable event, trigger, or condition. For example, the tagging tool 112 may modify a category tag of a contact to reflect a change of occupation of the contact.

The computing device 100 includes a network interface 114 configured to communicatively couple the computing device 100 to one or more remote computing devices, via a computer network 124. The network interface 114 may include any suitable computer hardware component to connect the computing device 100 to the computer network 124. For example, the network interface 114 may include any suitable wired or wireless communication hardware. In the illustrated implementation, the network interface 114 may communicatively couple the computing device 100 with the remote storage computing device 126 and/or any of a plurality of remote computing devices 132.

The computing device 100 includes a sharing tool 116 configured to share a selected digital payload with a recipient computing device selected from the plurality of remote computing devices 132. The sharing tool 116 may send the selected digital payload to the recipient computing device via the network interface 114. The selected digital payload may be selected from any suitable storage location. In some cases, the selected digital payload may be selected from the plurality of locally stored digital payloads 104. In other cases, the selected digital payload may be selected from a plurality of digital payloads 128 stored on the remote computing device 126. The remote storage computing device 126 may take any suitable form. In one example, the remote storage computing device 126 is a server computing device. In another example, the remote storage computing device 126 is a cloud computing system. In yet another example, the remote storage computing device 126 is another computing device associated with the user, such as a mobile computing device or smartphone.

The sharing tool 116 may be configured to share any suitable type of digital payload 104. For example, the sharing tool 116 may be configured to send an email, a digital photograph, a video chat, an audio file, an SMS message, or another type of digital payload. In some implementations, the sharing tool 116 may be configured to share more than one type of digital payload 104. For example, the sharing tool 116 may be configured to send an email that includes an attached document or digital photograph. In some implementations, the computing device 100 may include different sharing tools for different types of digital payloads. For example, the computing device may include different sharing tools for sharing digital photographs and sending SMS messages. The sharing tool 116 may take any suitable form. Non-limiting examples of the sharing tool 116 may include, but are not limited to, a standalone application, a web application, a background service, a component of an operating system, an executable, or another suitable computing component.

The computing device includes a storage controller 118 configured to access the plurality of network-sharable digital payloads via the storage machine 102. The storage controller 118 may take any suitable form. In one example, the storage controller is a component of an operating system. In another example, the storage controller is a component of an application. In some implementations, the storage controller 118 may include or cooperate with a digital circuit including logic configured for storage and access of the plurality of digital payloads 104. For example, the storage controller 118 may be configured to retrieve a selected digital payload from the storage machine 102 based on the sharing tool 116 sharing the selected digital payload with a recipient computing device. In some implementations, the storage controller 118 is configured to retrieve a selected digital payload from a remote storage location, such as on remote computing device 126.

In some implementations, the computing device 100 includes a contact service 120 configured to recognize one or more category designations of a contact based on the contact's one or more category tags. For example, the contact may be a prospective recipient of a digital payload that is being shared by the sharing tool 116. The prospective recipient may be associated with one of the plurality remote computing devices 132. The contact service 120 may recognize the category designation(s) of the contact and pass along the recognized category designations to a protection service 122 of the computing device 100.

The contact service 120 may analyze a contact's category tags in any suitable manner to recognize the category designations of the contact. For example, the contact service 120 may recognize category designations directly from the category tags. In another example, the contact service 120 may include logic to infer a category designation based on descriptive terms provided by the category tags.

Moreover, the contact service 120 may analyze the contact's category tags to recognize the category designations at any suitable time. For example, the contact service 120 may recognize the category designations of a contact when the contact is created. Further, the contact service 120 may recognize and/or modify the category designations of a contact when a category tag of the contact is modified.

In the illustrated example, the contact service 120 recognizes that different contacts associated with different remote computing devices 132 have one or more different category designations. In particular, the contact service 120 recognizes that the contacts associated with the remote computing devices 132A-132C have a work designation based on the contact tags. In other words, the contacts associated with the remote computing devices 132A-132C belong to a work group 134. Further, the contact service 120 recognizes that the contacts associated with the remote computing devices 132A-132B also belong to a marketing department group 136 that is a sub-group of the work group 134. Further, the contact service 120 recognizes that the contacts associated with the remote computing devices 132C-132D belong to a personal group 138. For example, the personal group could be members of a fantasy football league. In this example, the contact associated with the remote computing device 132C has both a work designation and a personal designation in relation to the user of the computing device 100.

The protection service 122 is configured to automatically control sharing of a selected digital payload 104 with a recipient computing device. In some implementations, the protection service 122 controls sharing of the selected digital payload based on determining whether or not a prospective recipient associated with the recipient computing device has a category designation that is inconsistent with one or both of a context category and a content category. The protection service 122 determines the content category of the digital content item from the one or more content tags 108 and the context category from the one or more context tags 110. In one example, when the sharing tool 116 attempts to share a selected digital payload 104 with a prospective recipient, the protection service 122 intervenes and/or intercepts the selected digital payload 104 to perform analysis on the prospective recipient and the digital payload to determine whether or not they are categorically consistent.

The protection service 122 may be configured to allow the sharing tool 116 to share the digital payload with the prospective recipient if the category designation of the prospective recipient is consistent with both of the context category and the content category of the digital payload. Further, the protection service 122 may automatically control sharing based on determining that a prospective recipient has a category designation that is inconsistent with a content category and/or a context category of a digital payload in any suitable manner. In one example, the protection service 122 is configured to automatically control sharing by blocking the selected digital payload from being shared with the prospective recipient. For example, the protection service 122 may block sharing of the selected digital payload with the recipient computing device based on determining that the prospective recipient has a personal designation and the selected digital payload has one or both of a work context and a work content. In another example, the protection service 122 may block sharing of the selected digital payload with the recipient computing device based on determining that the prospective recipient has a personal designation and the selected digital payload has one or both of a work context and a work content.

In another example, the protection service 122 is configured to automatically control sharing by delaying the selected digital payload from being shared with the prospective recipient until a sending user overrides a warning. For example, the protection service 122 may delay sharing of the selected digital payload with the recipient computing device based on determining that the prospective recipient has a personal designation and the selected digital payload has one or both of a work context and a work content. In another example, the protection service 122 may delay sharing of the selected digital payload with the recipient computing device based on determining that the recipient has a work designation and the selected digital payload has one or both of a personal context and a personal content.

In another example, the protection service 122 is configured to automatically control sharing by delaying sharing of the selected digital payload with the recipient computing device until a portion of content is removed from the selected digital payload. For example, in the case of a digital payload including text, such as an email or an SMS message, the protection service 122 may determine that the digital payload is categorically inconsistent with the prospective recipient based on particular keywords in the text indicated by the content tags. Accordingly, the protection service 122 may present a recommendation to remove such keywords or make other changes to the content to make the digital payload more categorically consistent with the prospective recipient.

In another example, the protection service 122 is configured to automatically control sharing by recommending one or more alternative recipients having a category designation that is consistent with the context category and the content category of the selected digital payload.

In some implementations, the protection service 122 may be further configured to automatically control sharing of the selected digital payload with the recipient computing device based on determining that a sending context is inconsistent with a category designation of the prospective recipient. The sending context may include one or more characteristics that define conditions when a digital payload is being shared with a prospective recipient. The sending context may provide an additional layer of logic or analysis beyond the context and content of a digital payload. In some scenarios, the protection service 122 may use the sending context to make a determination about categorical consistency between a digital payload and a prospective recipient when the content and context of the digital payload do not provide a clear answer.

The protection service 122 may determine that a sending context is inconsistent with a category designation of a prospective recipient in any suitable manner. In one example, the sending context indicates that a time at which the selected payload is being shared is during a timeframe associated with a particular category, such as a work timeframe or a personal timeframe. In another example, the sending context indicates that a time at which the selected digital payload is being shared is within a threshold duration of a type of activity performed on the computing device 100 that is associated with a particular category, such as a work activity or personal activity. In another example, the sending context indicates that the selected digital payload is being shared from a computing device associated with a particular category, such as a work-designated computing device or a personal-designated computing device. In another example, the sending context indicates that the selected digital payload is being shared using an identity (e.g., an email address, social network profile) associated with a particular category, such as a work-designated identity or a personal-designated identity. In another example, the sending context indicates that the selected payload is being shared during computing activity with a contact associated with a particular category, such as a work-designated contact or a personal-designated contact.

By performing such categorical consistency analysis and subsequent automatic sharing control, the protection service 122 may reduce the likelihood of the sharing tool 116 sharing a digital payload that is not categorically consistent with a prospective recipient relative to a configuration that provides no such protections.

The protection service 122 may take any suitable form. Non-limiting examples of the protection service 122 may include, but are not limited to, a standalone application, a web application, a background service, a component of an operating system, an executable, or another suitable computing component. In some implementations, the protection service 122 may be part of the sharing tool 116. In other implementations, the protection service 122 may be a standalone application that monitors the sharing tool 116.

In some implementations, the protection service 122 may be at least partially implemented by other computing devices. As such, the description of protection service 122 is applicable to protection services of cooperating computing devices. For example, the protection service 122 may be implemented as part of a user-controlled email server and/or a remote cloud-computing email server.

Figure 2A:
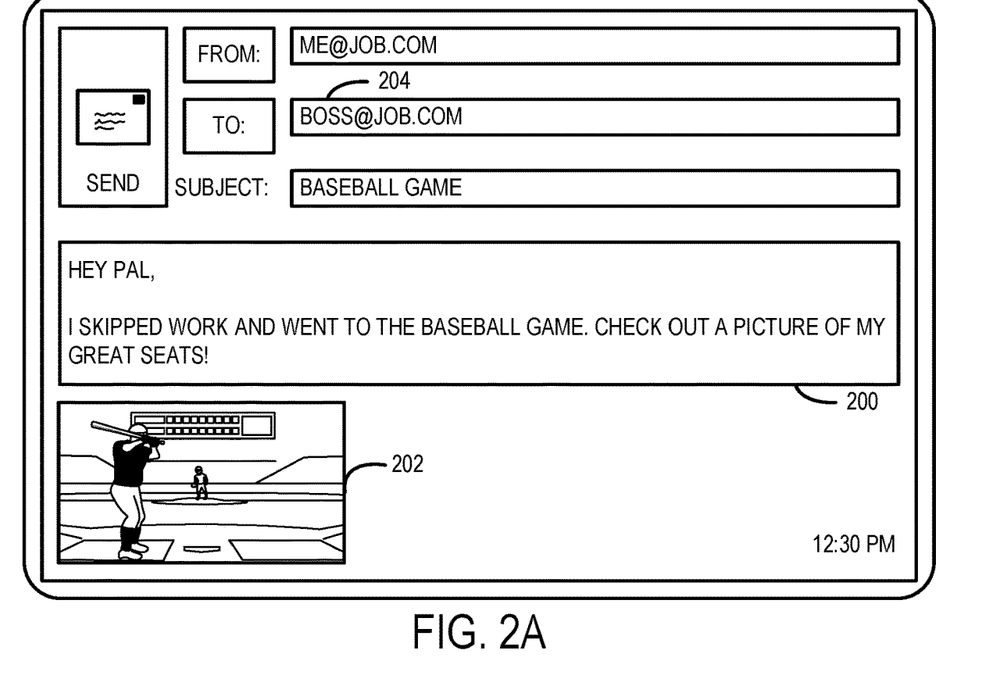
FIGS. 2A-2F show different scenarios of automatically controlling sharing of a selected digital payload based on a prospective recipient having a work designation that is inconsistent with one or more of a content, a context, and a sharing context of the selected digital payload.

FIGS. 2A-2F, 3A-3E, and 4 show example scenarios in which the protection service 122 automatically controls sharing of a selected digital payload with a prospective recipient. FIG. 2A shows an example scenario in which a user attempts to share a plurality of digital payloads including an email message 200 and a digital photograph 202 with the user's pal. However, the user accidently provides an email address of the user's boss instead of the user's pal. In other words, the user indicates to the sharing tool 116 that the user's boss is the prospective recipient 204 of the digital payloads 200 and 202.

The protection service 122 may intervene prior to the sharing tool 116 sharing the digital payloads 200 and 202 with the prospective recipient 204 in order to determine whether a content and/or a context of each of the digital payloads 200 and 202 are consistent with a category designation of the prospective recipient 204. The protection service 122 automatically controls sharing of the digital payloads 200 and 202 based on such determinations.

In this scenario, the email 200 includes content tags indicating that the content of the email includes keywords related to "baseball" and the user's "pal." As such, the protection service 122 determines that the email 200 is directed to personal content based on the content tags. Further, the email 200 includes context tags indicating that the email 200 is generated on the user's smartphone while the smartphone is geographically located at the baseball stadium. As such, the protection service 122 determines that the email 200 has a personal context based on the context tags. The digital photograph 202 includes content tags indicating that image features of the digital photograph are related to "baseball." As such, the protection service 122 determines that the digital photograph 202 is directed to personal content based on the content tags. Further, the digital photograph 202 includes context tags indicating that the digital photograph 202 is generated on the user's smartphone while the smartphone is geographically located at the baseball stadium. As such, the protection service 122 determines that the digital photograph 202 has a personal context based on the context tags. Furthermore, the protection service 122 determines that the sending context is personal in nature base on the digital payloads 200 and 202 being sent from the geographic location of the baseball stadium, which is not a work-designated location.

In this scenario, the digital payloads 200 and 202 include information of a personal nature that is not meant for the user's boss. Accordingly, if the user were allowed to accidentally share the digital payloads 200 and 202 with the user's boss, then the user could face negative repercussions for mistakenly sharing such information. However, the protection service 122 determines that the digital payloads 200 and 202 are personal, and therefore inconsistent with the work designation of the user's boss. Accordingly, the protection service 122 automatically controls sharing of the digital payloads 200 and 202. FIGS. 2B-2F show different manners in which the protection service 122 can automatically control sharing of the digital payloads 200 and 202 to reduce a likelihood of the user accidentally sharing the digital payloads 200 and 202 with the user's boss.

Figure 2B:
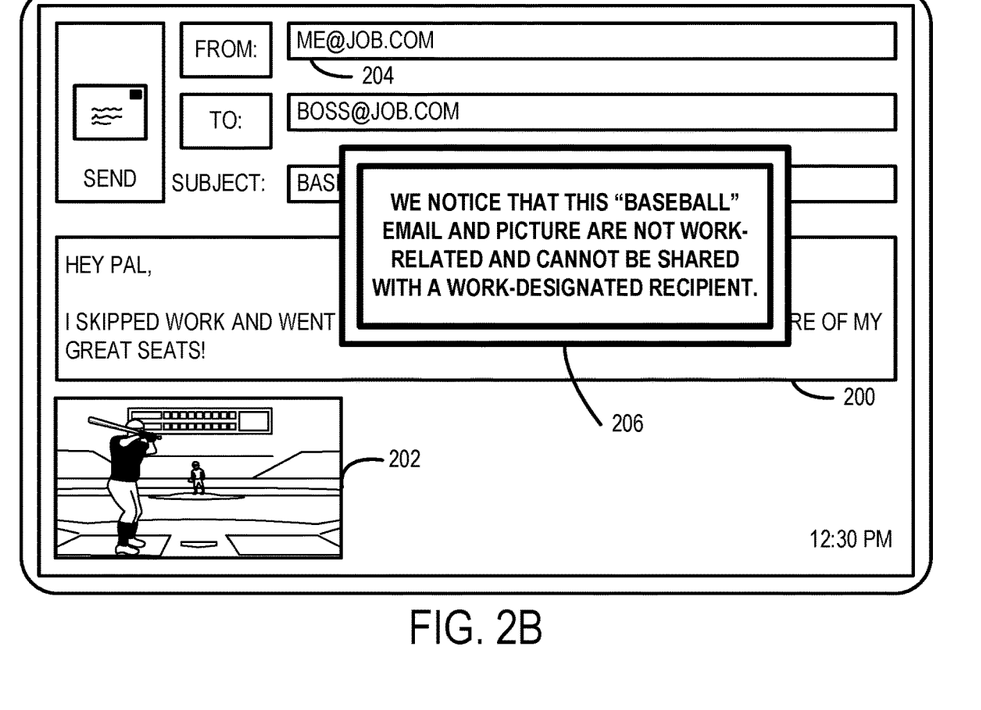

In FIG. 2B, the protection service 122 automatically controls sharing of the digital payloads 200 and 202 by blocking the sharing tool 116 from sharing the digital payloads 200 and 202 with the prospective recipient 204. In particular, the protection service 122 does not send the message and visually presents a notification 206 indicating that the "baseball" email and digital photograph/picture cannot be shared with a work-designated recipient because the email and digital photograph/picture are not work-related. In this scenario, the protection service 122 allows the sharing tool 116 to share only work-related digital payloads with work-related recipients.

Figure 2C:
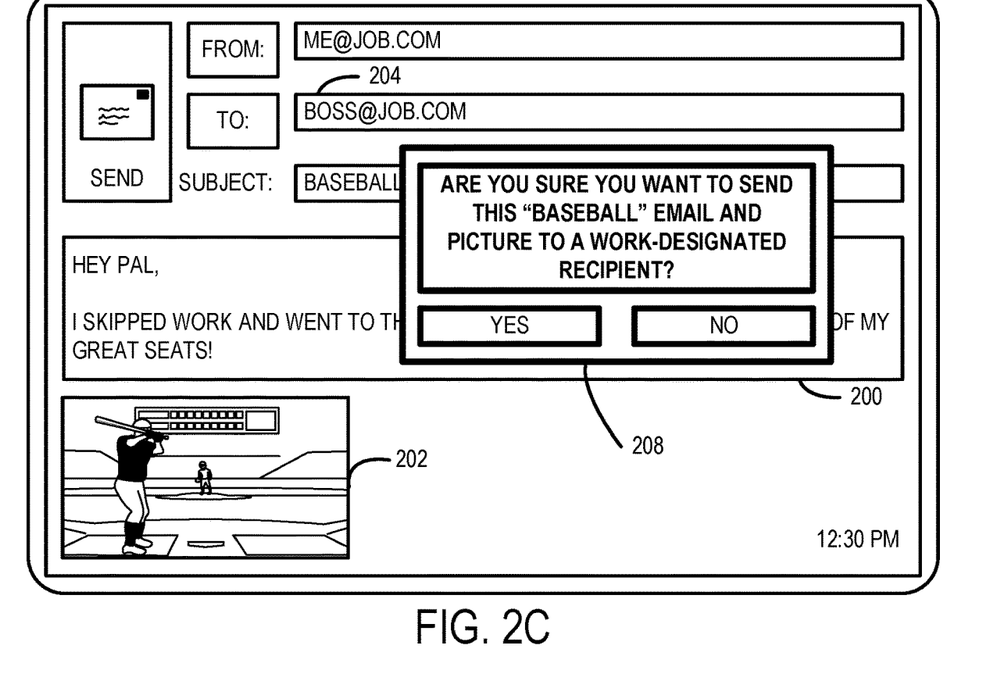

In FIG. 2C, the protection service 122 automatically controls sharing of the digital payloads 200 and 202 by delaying the sharing tool 116 from sharing the digital payloads 200 and 202 with the prospective recipient 204 until the user overrides a warning 208. In particular, the protection service 122 visually presents the warning 208 asking the user to confirm that the "baseball" email and digital photograph/picture can be shared with a work-designated recipient even though the email and digital photograph/picture appear not to be work-related. In this scenario, the user may select "YES" in order for the protection service 122 to allow the sharing tool 116 to share the digital payloads 200 and 202 with the work-related recipient 204. On the other hand, if the user selects "NO," then the protection service 122 would block the sharing tool 116 from sharing the digital payloads 200 and 202 with the work-related recipient 204.

Figure 2D:
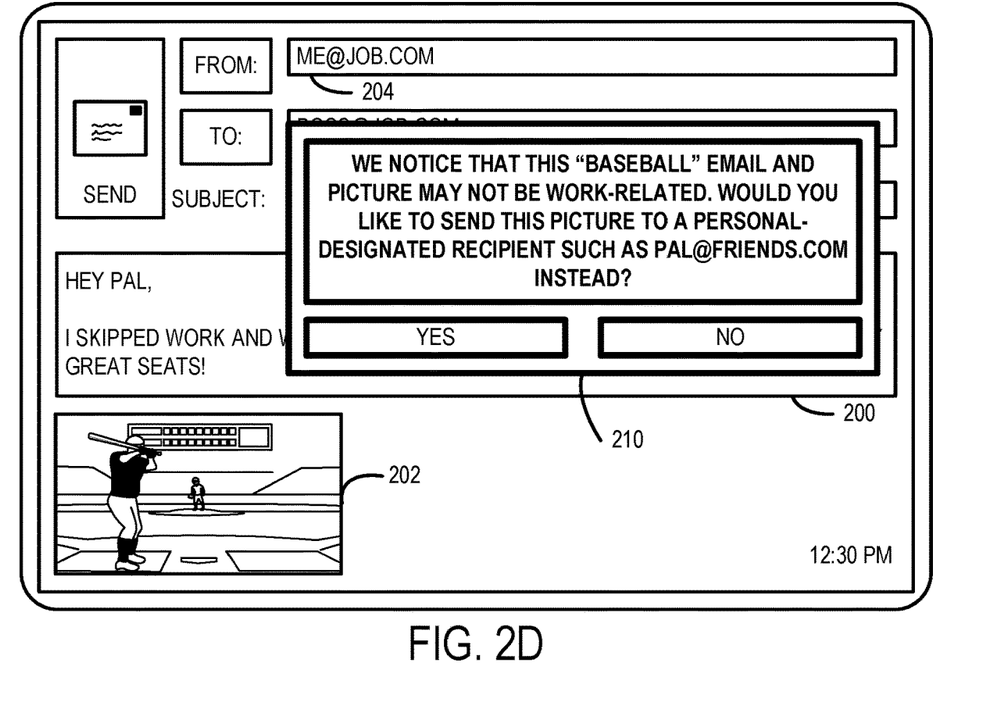

In FIG. 2D, the protection service 122 automatically controls sharing of the digital payloads 200 and 202 by recommending an alternative recipient having a personal designation that is consistent with the content and the context of the digital payloads 200 and 202. In particular, the protection service 122 visually presents a notification 210 asking whether the user would like to send the "baseball" email and digital photograph/picture to a personal-designated recipient, such as PAL@FRIENDS.COM. In this example, the protection service 122 recommends an email address associated with the user's pal based on recognizing the user's pal in the content of the email 200. In another example, the protection service 122 may recommend other personal-designated recipients based on a sharing history of the user. In another example, the protection service 122 may recommend a recipient that has a personal designation and further a sub-group designation related to baseball, such as a member of a fantasy baseball league in which the user participates. In this scenario, the user may select "YES" in order for the protection service 122 to replace the email address of the user's boss with the email address of the user's pal, and allow the sharing tool 116 to share the digital payloads 200 and 202 with the user's pal.

Figure 2E:
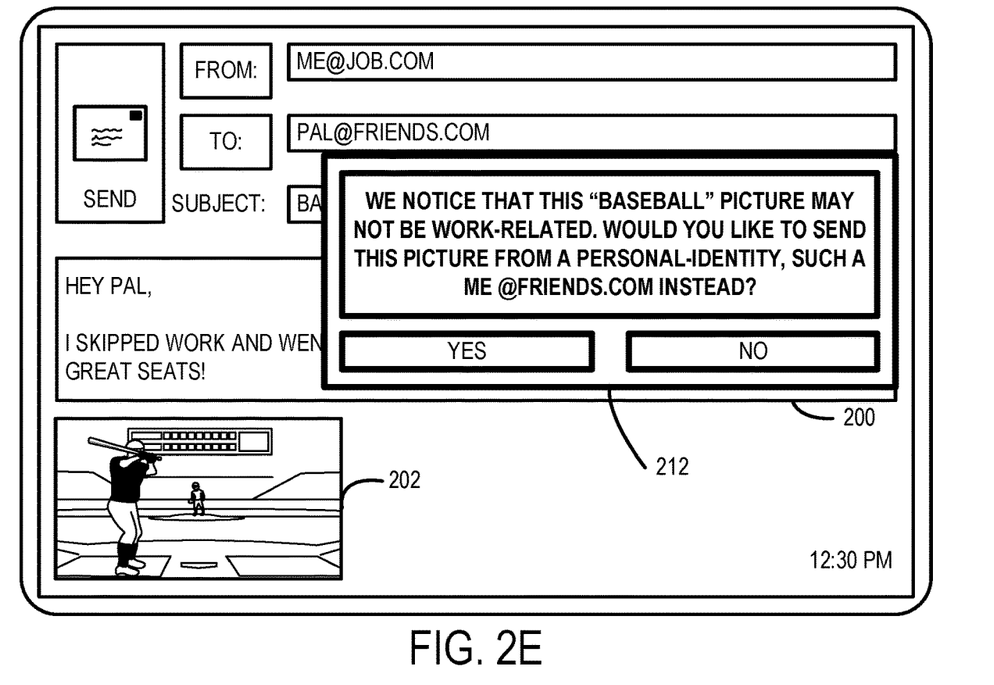

In FIG. 2E, alternatively or in addition to recommending an alternative recipient as discussed in FIG. 2D, the protection service 122 automatically controls sharing of the digital payloads 200 and 202 by recommending that the digital payloads 200 and 200 be shared using an alternative user identity having a personal designation that is consistent with the content and the context of the digital payloads 200 and 202. In particular, the protection service 122 visually presents a notification 212 asking whether the user would like to send the "baseball" email and digital photograph/picture from a personal-designated identity, such as ME@FRIENDS.COM. In this scenario, the user may select "YES" in order for the protection service 122 to replace the user's work-designated email address with the user's personal-designated email address, and allow the sharing tool 116 to share the digital payloads 200 and 202 with the user's pal.

Figure 2F:
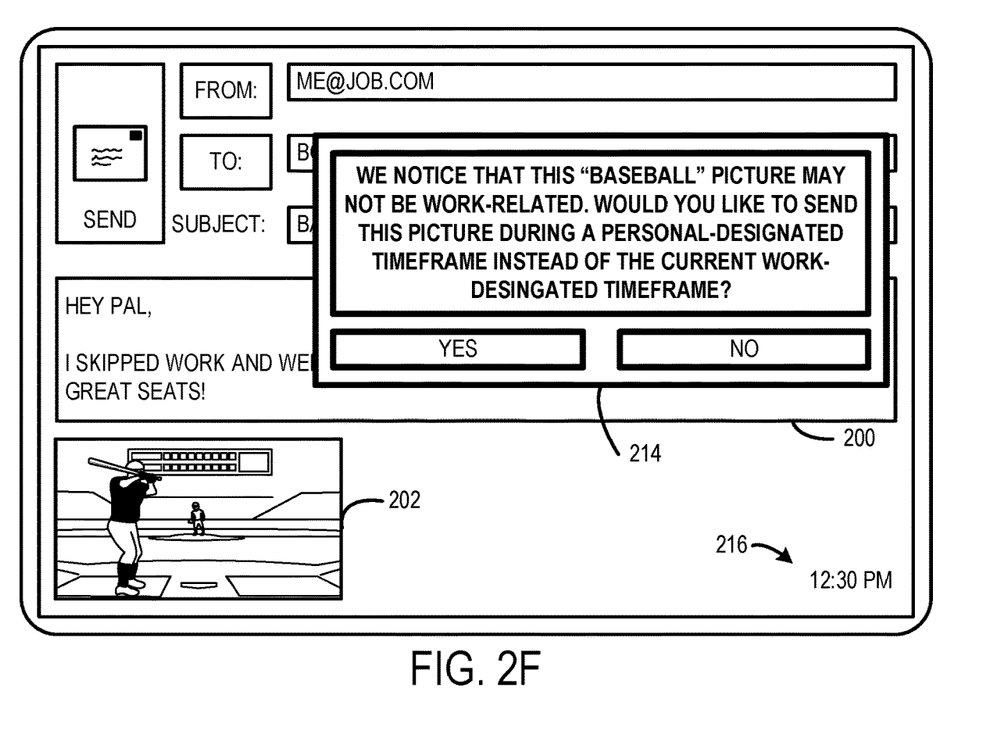

In FIG. 2F, the protection service 122 automatically controls sharing of the digital payloads 200 and 202 by recommending delaying sharing of the digital payloads 200 and 202 until a personal timeframe that is consistent with the personal content and the personal context of the digital payloads 200 and 202. In particular, the protection service 122 visually presents a notification 214 asking whether the user would like to send the "baseball" email and digital photograph/picture during a personal-designated timeframe instead of the current work-designated timeframe. The protection service 122 may determine work and personal timeframes in any suitable manner. Further, the protection service 122 may determine a current timeframe based on a time 216 when the digital payloads 200 and 202 are being shared. Such a determination may be included as part of a sharing context determination. In this scenario, the user may select "YES" in order for the protection service 122 to delay the sharing tool 116 from sharing the digital payloads 200 and 202 until the personal timeframe, which may occur after a work timeframe, for example.

Figure 3A:
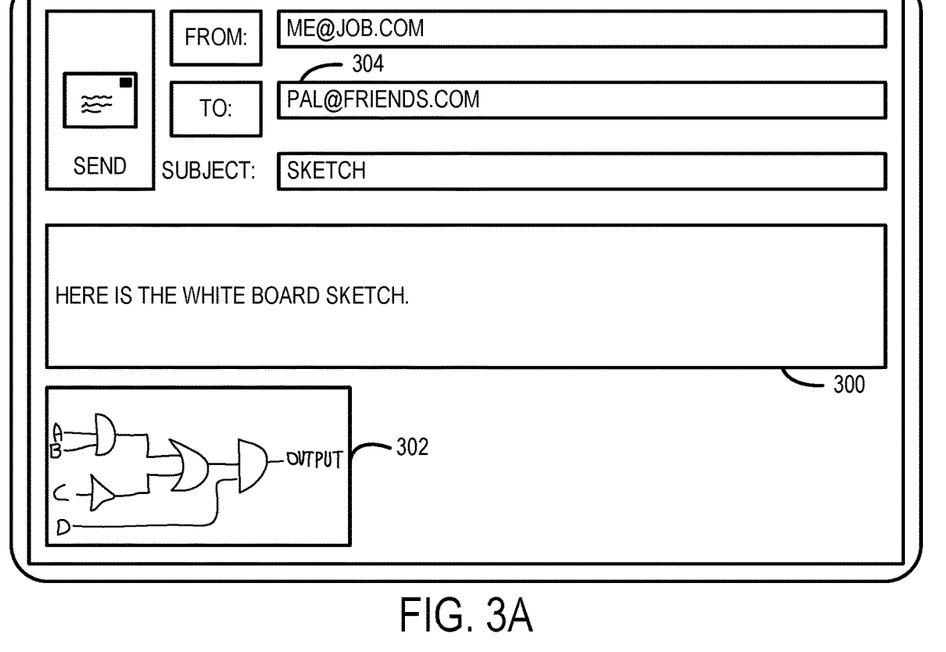
FIGS. 3A-E show different scenarios of automatically controlling sharing of a selected digital payload based on a prospective recipient having a personal designation that is inconsistent with one or more of a content, a context, and a sharing context of the selected digital payload.

FIG. 3A shows another example scenario in which a user attempts to share a plurality of digital payloads including an email message 300 and a digital photograph 302 with the user's boss. However, the user accidently provides an email address of the user's pal instead of the user's boss. In other words, the user indicates to the sharing tool 116 that the user's pal is the prospective recipient 304 of the digital payloads 300 and 302.

The protection service 122 may intervene prior to the sharing tool 116 sharing the digital payloads 300 and 302 with the prospective recipient 304 in order to determine whether a content and/or a context of each of the digital payloads 300 and 302 are consistent with a category designation of the prospective recipient 304. The protection service 122 automatically controls sharing of the digital payloads 300 and 302 based on such determinations.

In this scenario, the email 300 includes content tags indicating that the content of the email includes keywords related to "white board" and "sketch." As such, the protection service 122 determines that the email 300 is directed to work content based on the content tags, because the user is more likely to send white board sketches to a co-worker than a contact having a different category designation. Further, the email 300 includes context tags indicating that the email 300 is generated on the user's work desktop computer while the desktop computer is geographically located at the user's office. As such, the protection service 122 determines that the email 300 has a work context based on the context tags.

The digital photograph 302 includes content tags indicating that image features of the digital photograph are related to "white board" and "sketches." As such, the protection service 122 determines that the digital photograph 302 is directed to work content based on the content tags. Further, the digital photograph 302 includes context tags indicating that the digital photograph 302 is taken at a time when the user is scheduled to have a meeting with the user's boss. For example, the protection service 122 may recognize the meeting time from the user's calendar. Further, the context tags indicate that the digital photograph was taken at a geographical location of the user's office, and the digital photograph is stored on a computing device within a domain of the user's company. As such, the protection service 122 determines that the digital photograph 302 has a work context based on the context tags.

The protection service 122 determines that the sending context is work-related based on the digital payloads 300 and 302 being sent from the geographic location of the user's office and during a work timeframe. Moreover, the protection service 122 determines that the digital payloads 300 and 302 are sent within a threshold time of the meeting with the user's boss—i.e., work-related activity.

In this scenario, the digital payloads 300 and 302 include work related information. In particular, the digital photograph of the white board sketches include corporate secrets that are not meant for the user's pal. Accordingly, if the user were allowed to accidentally share the digital payloads 300 and 302 with the user's pal, then the user could face negative repercussions for mistakenly sharing such information. However, the protection service 122 determines that the digital payloads 300 and 302 are work related, and therefore inconsistent with the personal designation of the user's pal. Accordingly, the protection service 122 automatically controls sharing of the digital payloads 300 and 302. FIGS. 3B-3E show different manners in which the protection service 122 can automatically control sharing of the digital payloads 300 and 302 to reduce a likelihood of the user accidentally sharing the digital payloads 300 and 302 with the user's pal relative to a configuration that provides no such protections.

Figure 3B:
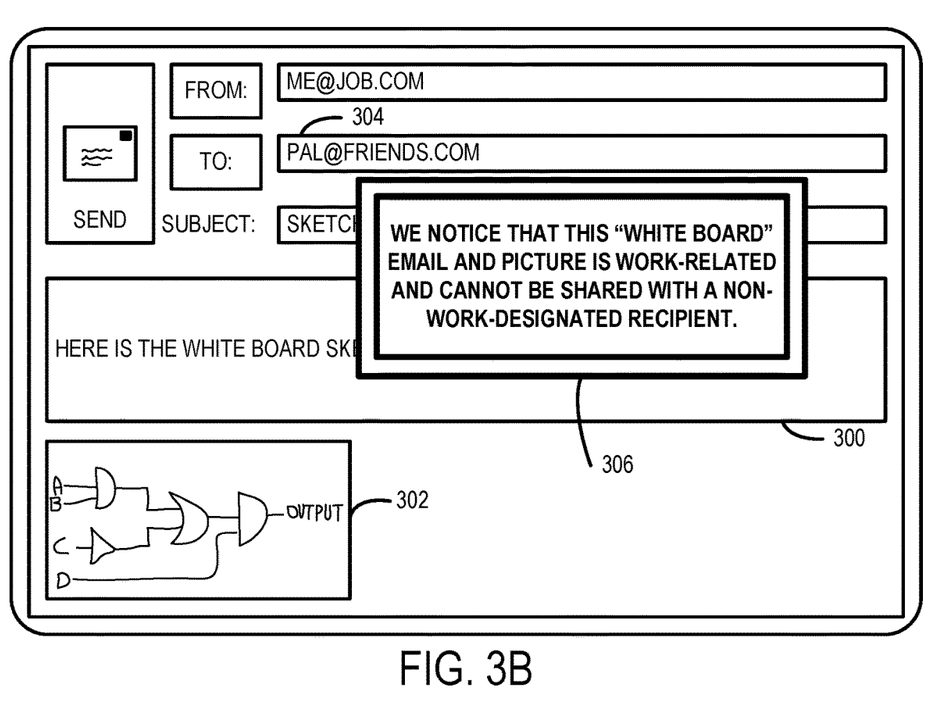

In FIG. 3B, the protection service 122 automatically controls sharing of the digital payloads 300 and 302 by blocking the sharing tool 116 from sharing the digital payloads 300 and 302 with the prospective recipient 304. In particular, the protection service 122 visually presents a notification 306 indicating that the "white board" email and digital photograph/picture cannot be shared with a non-work-designated recipient because the email and digital photograph/picture are work-related. In this scenario, the protection service 122 allows the sharing tool 116 to share only work-related digital payloads with work-related recipients.

Figure 3C:
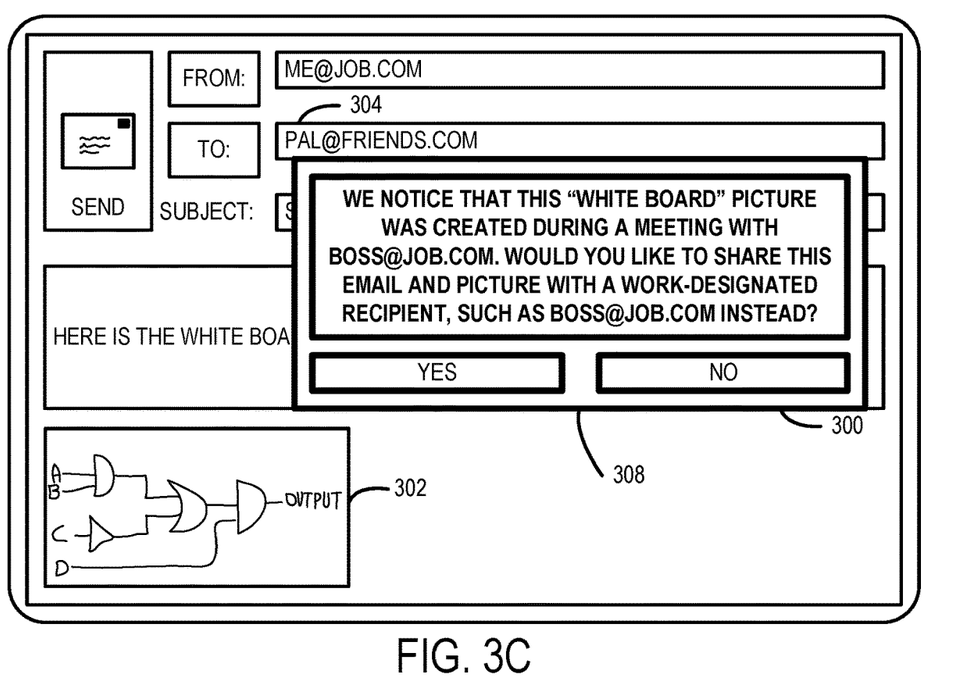

In FIG. 3C, the protection service 122 automatically controls sharing of the digital payloads 300 and 302 by recommending an alternative recipient having a work designation that is consistent with the content and the context of the digital payloads 300 and 302. In particular, the protection service 122 visually presents a notification 308 asking whether the user would like to send the "white board" email and digital photograph/picture to a work-designated recipient, such as BOSS@JOB.COM. In this example, the protection service 122 recommends an email address associated with the user's boss based on recognizing that the digital photograph was taken during a meeting with the user's boss. In another example, the protection service 122 may recommend other work-designated recipients that were present during the meeting based on invitees listed in the user's calendar. In this scenario, the user may select "YES" in order for the protection service 122 to replace the email address of the user's pal with the email address of the user's boss, and allow the sharing tool 116 to share the digital payloads 300 and 302 with the user's boss.

Figure 3D:
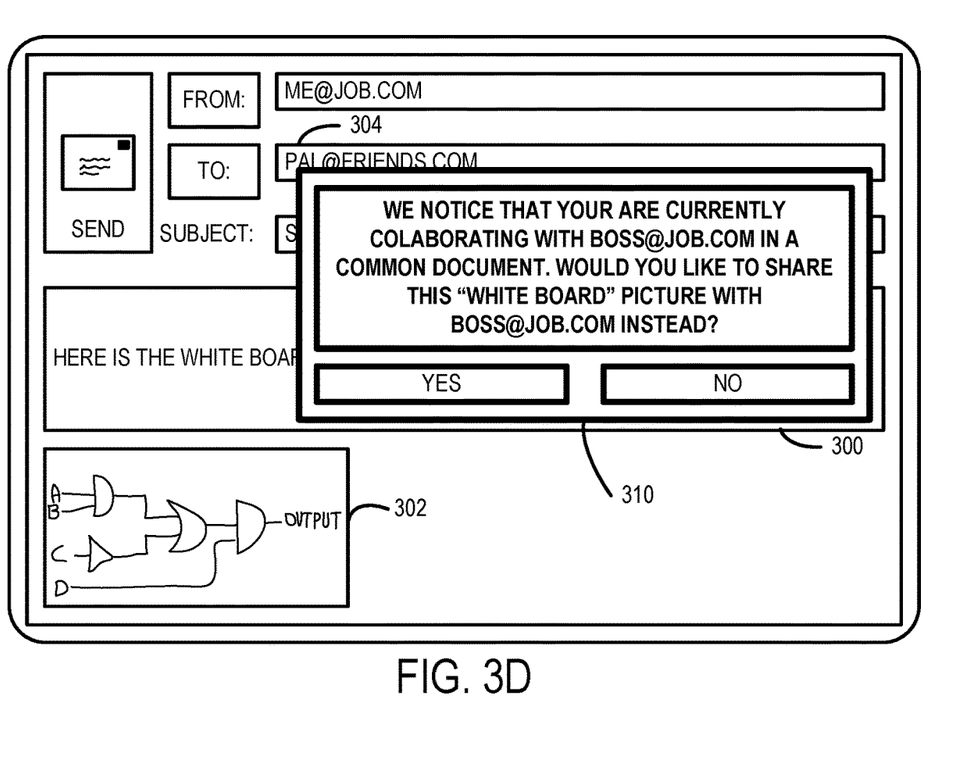

In FIG. 3D, the protection service 122 automatically controls sharing of the digital payloads 300 and 302 by recommending an alternative recipient having a work designation that is consistent with the content and the context of the digital payloads 300 and 302 based on recognizing current work-related computing activity between the user and the alternative recipient. In particular, the protection service 122 recognizes that the user is currently collaborating with the user's boss in a common document, such as a spreadsheet. Accordingly, the protection service 122 visually presents a notification 310 asking whether the user would like to send the "white board" email and digital photograph/picture to the email address BOSS@JOB.COM that is associated with the user's boss. In this scenario, the user may select "YES" in order for the protection service 122 to replace the email address of the user's pal with the email address of the user's boss, and allow the sharing tool 116 to share the digital payloads 300 and 302 with the user's boss.

Figure 3E:
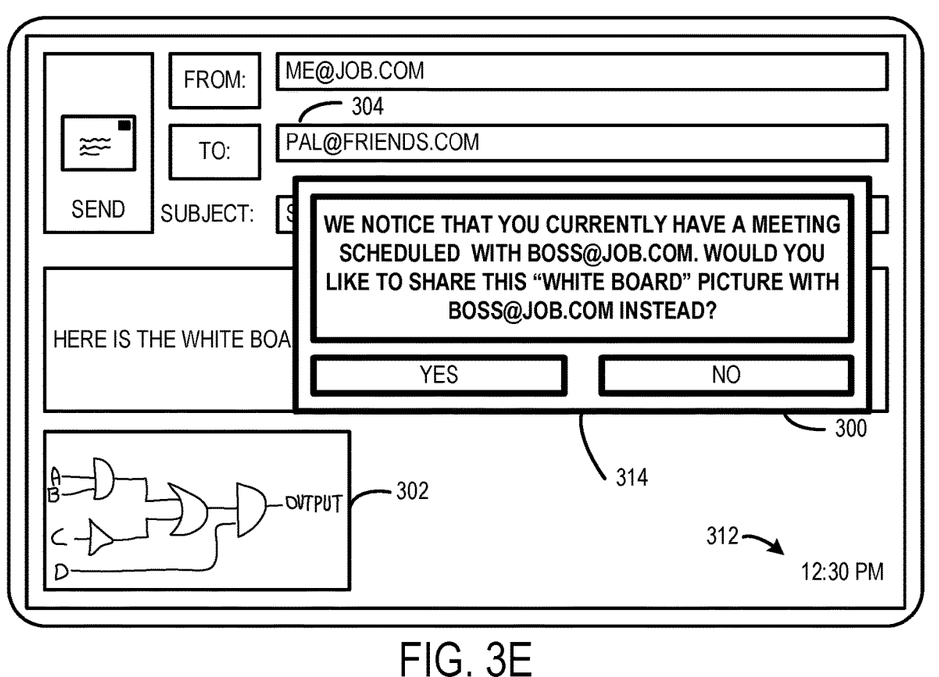

In FIG. 3E, the protection service 122 automatically controls sharing of the digital payloads 300 and 302 by recommending an alternative recipient having a work designation that is consistent with the content and the context of the digital payloads 300 and 302 based on recognizing that the user is scheduled to meet with the alternative recipient. For example, the protection service 122 may recognize that the user has a meeting scheduled with the user's boss from an entry in the user's calendar and comparing the scheduled meeting time with a current time 312. Accordingly, the protection service 122 visually presents a notification 314 asking whether the user would like to send the "white board" email and digital photograph/picture to the email address BOSS@JOB.COM that is associated with the user's boss. In this scenario, the user may select "YES" in order for the protection service 122 to replace the email address of the user's pal with the email address of the user's boss, and allow the sharing tool 116 to share the digital payloads 300 and 302 with the user's boss.

Figure 4A:
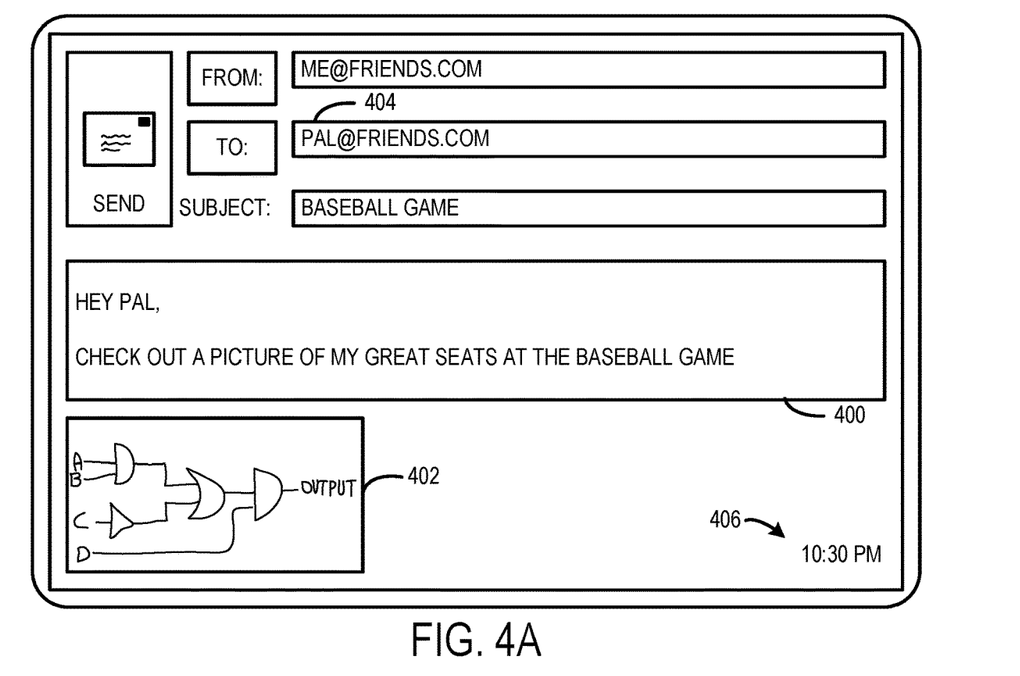
FIGS. 4A-B show a scenario of automatically controlling sharing of a selected digital payload based on a sharing context and a prospective recipient having a personal designation that is inconsistent with a work content and a work context of the selected digital payload.

FIG. 4A shows another example in which a user attempts to share a plurality of digital payloads including an email message 400 and a digital photograph 402 with the user's pal. However, the user accidently shares a digital photograph that is inconsistent with the category designation of the sharing context and the prospective recipient. The protection service 122 may intervene prior to the sharing tool 116 sharing the digital payloads 400 and 402 with a prospective recipient 404 in order to determine whether a content and/or a context of each of the digital payloads 400 and 402 are consistent with a category designation of the prospective recipient 404. The protection service 122 automatically controls sharing of the digital payloads 400 and 402 based on such determinations.

In this scenario, the email 400 includes content tags indicating that the content of the email includes keywords related to "baseball." As such, the protection service 122 determines that the email 400 is directed to personal content based on the content tags. Further, the email 400 includes context tags indicating that the email 400 is generated on the user's personal desktop computer while the personal desktop computer is geographically located at the user's home. As such, the protection service 122 determines that the email 400 has a personal context based on the context tags.

The digital photograph 402 includes content tags indicating that image features of the digital photograph are related to "white board" and "sketches." As such, the protection service 122 determines that the digital photograph 402 is directed to work content based on the content tags. Further, the digital photograph 402 includes context tags indicating that the digital photograph 402 was taken at a time when the user was scheduled to have a meeting with the user's boss. For example, the protection service 122 may recognize the meeting time from the user's calendar. Further, the context tags indicate that the digital photograph was taken at a geographical location of the user's office. As such, the protection service 122 determines that the digital photograph 402 has a work context based on the context tags.

The protection service 122 determines that the sending context is personal based on the digital payloads 400 and 402 being sent from the geographic location of the user's home and a current time 406 being within a personal timeframe.

Figure 4B:
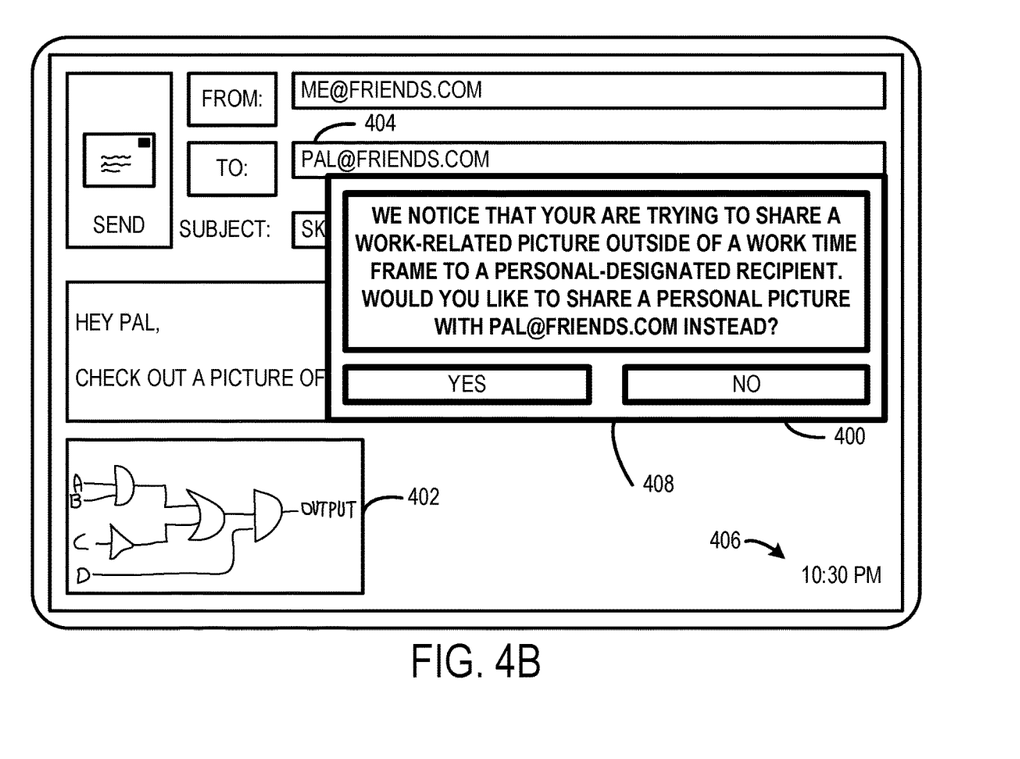

In FIG. 4B, the protection service 122 automatically controls sharing of the digital payloads 400 and 402 by recommending an alternative digital payload that is consistent with the sharing context and category designation of the prospective recipient 404. In particular, the protection service 122 visually presents a notification 408 indicating that the user is trying to share a work related digital photograph to a non-work related recipient outside of a work timeframe. Further the notification 408 asks whether the user would like to share a personal picture with PAL@FRIENDS.COM instead. In this scenario, the user may select "YES" in order for the protection service 122 to replace the digital photograph 402 with an alternative digital photograph. For example, the protection service 122 may recommend an alternative photograph that is contextually consistent with the content of the email 400.

Figure 5:
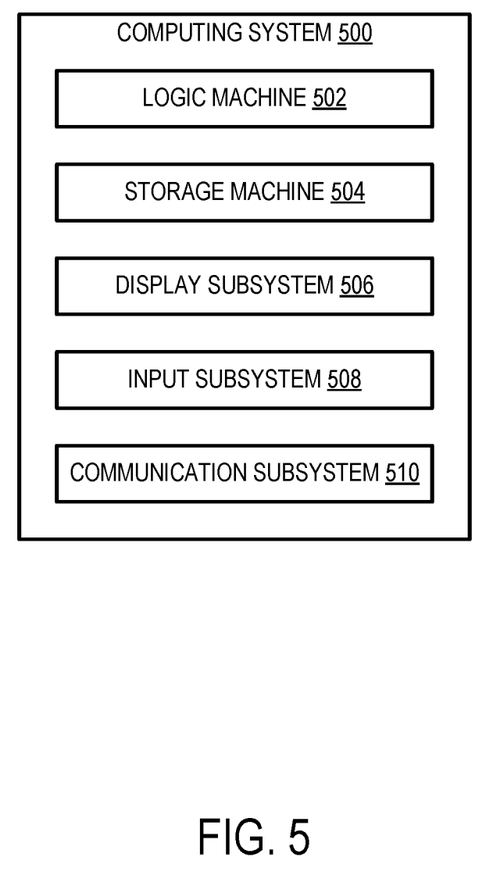
FIG. 5 shows a computing system.

FIG. 5 schematically shows a non-limiting implementation of a computing system 500 configured to automatically control sharing of a selected digital payload with a prospective recipient. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), virtual-reality devices, and/or other computing devices. For example, the computing system 500 may be a non-limiting example of the computing device 100 of FIG. 1.

Computing system 500 includes a logic machine 502 and a storage machine 504. Computing system 500 may optionally include a display subsystem 506, input subsystem 508, communication subsystem 510, and/or other components not shown in FIG. 5.

Logic machine 502 includes one or more physical devices configured to execute instructions. For example, the logic machine 502 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 502 may include one or more processors configured to execute software instructions. Additionally or alternatively, the logic machine 502 may include one or more hardware or firmware logic machines configured to execute hardware or firmware instructions. Processors of the logic machine 502 may be single-core or multi-core, and the instructions executed thereon may be configured for sequential, parallel, and/or distributed processing. Individual components of the logic machine 502 optionally may be distributed among two or more separate devices, which may be remotely located and/or configured for coordinated processing. Aspects of the logic machine 502 may be virtualized and executed by remotely accessible, networked computing devices configured in a cloud-computing configuration.

Storage machine 504 includes one or more physical devices configured to hold instructions executable by the logic machine 502 to implement the methods and processes described herein. When such methods and processes are implemented, the state of storage machine 504 may be transformed—e.g., to hold different data.

Storage machine 504 may include removable and/or built-in devices. Storage machine 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 504 may include volatile, nonvolatile, dynamic, static, read/write, read-only, random-access, sequential-access, location-addressable, file-addressable, and/or content-addressable devices.

It will be appreciated that storage machine 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 502 and storage machine 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 506 may be used to present a visual representation of data held by storage machine 504. This visual representation may take the form of a graphical user interface (GUI). As the herein described methods and processes change the data held by the storage machine, and thus transform the state of the storage machine, the state of display subsystem 506 may likewise be transformed to visually represent changes in the underlying data. Display subsystem 506 may include one or more display devices utilizing virtually any type of technology. Such display devices may be combined with logic machine 502 and/or storage machine 504 in a shared enclosure, or such display devices may be peripheral display devices. As a non-limiting example, display subsystem 506 may include the near-eye displays described above.

When included, input subsystem 508 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some implementations, the communication subsystem 510 may allow computing system 500 to send and/or receive messages to and/or from other devices via a network such as the Internet.

In an example, a computing device, comprises a network interface communicatively coupling the computing device to one or more remote computing devices, a storage controller configured to access a plurality of network-sharable digital payloads, each of the plurality of digital payloads associated with a plurality of access tags including one or more content tags and one or more context tags, a sharing tool configured to share, with a recipient computing device of the one or more remote computing devices via the network interface, a selected digital payload from the plurality of digital payloads, and a protection service configured to automatically control sharing of the selected digital payload with the recipient computing device based on determining that a prospective recipient associated with the recipient computing device has a work designation or a personal designation that is inconsistent with one or both of a context indicated by the one or more context tags and a content indicated by the one or more content tags. In this example, the protection service may be configured to automatically control sharing by blocking the selected digital payload from being shared with the prospective recipient. In this example, the protection service may be configured to automatically control sharing by delaying the selected digital payload from being shared with the prospective recipient until a sending user overrides a warning. In this example, the computing device may further comprise a contact service configured to recognize a tag associated with a prospective recipient as indicating one or both of a work designation and a personal designation. In this example, the one or more context tags may indicate that the selected digital payload is stored on one of a work-designated storage device or personal-designated storage device. In this example, the one or more context tags may indicate that the selected digital payload was created on a work-designated computing device or a personal-designated computing device. In this example, the one or more context tags may indicate that the selected digital payload was created at a work-designated location or a personal-designated location. In an example, the one or more context tags may indicate that the selected digital payload was created during a work-designated timeframe or a personal-designated timeframe. In this example, the one or more content tags may indicate work-designated keywords or personal-designated keywords included in the selected digital payload. In this example, the one or more content tags may indicate work-designated image features or personal-designated image features included in the selected digital payload. In this example, the protection service may be further configured to automatically control sharing of the selected digital payload with the recipient computing device based on determining that a sending context is inconsistent with the prospective recipient. In this example, the sending context may indicate that a time at which the selected payload is being shared is during a work timeframe or a personal timeframe. In this example, the sending context may indicate that a time at which the selected digital payload is being shared is within a threshold duration of previous work activity or previous personal activity on the computing system. In this example, the sending context may indicate that the selected digital payload is being shared from a work-designated computing device or a personal-designated computing device. In this example, the sending context may indicate that the selected digital payload is being shared using a work-designated identity or a personal-designated identity. In this example, the sending context may indicate that the selected payload is being shared during computing activity with a work-designated contact or a personal-designated contact.

In an example, a computing device, comprises a network interface communicatively coupling the computing device to one or more remote computing devices, a storage controller configured to access a plurality of network-sharable digital payloads, each of the plurality of digital payloads associated with a plurality of access tags including one or more content tags and one or more context tags, a sharing tool configured to share, with a recipient computing device of the one or more remote computing devices via the network interface, a selected digital payload from the plurality of digital payloads, and a protection service configured to automatically control sharing of the selected digital payload with the recipient computing device based on determining that a prospective recipient associated with the recipient computing device has a category designation selected from a plurality of different category designations that is inconsistent with one or both of a context category indicated by the one or more context tags and a content category indicated by the one or more content tags. In this example, the plurality of different category designations may include a work designation and a personal designation. In this example, the protection service may be further configured to automatically control sharing of the selected digital payload with the recipient computing device based on determining that a sending context is inconsistent with the prospective recipient.

In an example, a computing device, comprises a network interface communicatively coupling the computing device to one or more remote computing devices, a storage controller configured to access a plurality of network-sharable digital payloads, each of the plurality of digital payloads associated with a plurality of access tags including one or more content tags and one or more context tags, a sharing tool configured to share, with a recipient computing device of the one or more remote computing devices via the network interface, a selected digital payload from the plurality of digital payloads, a contact service configured to recognize one or more tags associated with the prospective recipient as indicating one or both of a work designation and a personal designation, and a protection service configured to automatically control sharing of the selected digital payload with the recipient computing device based on determining that a prospective recipient associated with the recipient computing device has a work designation or a personal designation that is inconsistent with one or more of a context indicated by the one or more context tags, a content indicated by the one or more content tags, and a sending context.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device, comprising:
a network interface communicatively coupling the computing device to one or more remote computing devices;
a processor; and
memory holding instructions executable by the processor to instantiate:
a storage controller configured to access a plurality of network-sharable digital payloads, each of the plurality of digital payloads associated with a plurality of access tags including one or more content tags and one or more context tags;
a sharing tool configured to share, with a recipient computing device of the one or more remote computing devices via the network interface, a selected digital payload from the plurality of digital payloads; and
a protection service configured to automatically delay the selected digital payload from being sent from the computing device to the recipient computing device until a sending user overrides a warning based on determining that a prospective recipient associated with the recipient computing device has a work designation or a personal designation that is inconsistent with one or both of a context indicated by the one or more context tags and a content indicated by the one or more content tags.

2. The computing device of claim 1, wherein the protection service is configured to automatically block the selected digital payload from being sent to the prospective recipient based on determining that the prospective recipient has a work designation or a personal designation that is inconsistent with one or both of a context indicated by the one or more context tags and a content indicated by the one or more content tags.

3. The computing device of claim 1, further comprising:
a contact service configured to recognize a tag associated with a prospective recipient as indicating one or both of a work designation and a personal designation.

4. The computing system of claim 1, wherein the one or more context tags indicate that the selected digital payload is stored on one of a work-designated storage device or personal-designated storage device.

5. The computing system of claim 1, wherein the one or more context tags indicate that the selected digital payload was created on a work-designated computing device or a personal-designated computing device.

6. The computing system of claim 1, wherein the one or more context tags indicate that the selected digital payload was created at a work-designated location or a personal-designated location.

7. The computing system of claim 1, wherein the one or more context tags indicate that the selected digital payload was created during a work-designated timeframe or a personal-designated timeframe.

8. The computing system of claim 1, wherein the one or more content tags indicate work-designated keywords or personal-designated keywords included in the selected digital payload.

9. The computing device of claim 1, wherein the one or more content tags indicate work-designated image features or personal-designated image features included in the selected digital payload.

10. The computing device of claim 1, wherein the protection service is further configured to automatically control sharing of the selected digital payload with the recipient computing device based on determining that a sending context is inconsistent with the prospective recipient.

11. The computing system of claim 10, wherein the sending context indicates that a time at which the selected payload is being shared is during a work timeframe or a personal timeframe.

12. The computing system of claim 10, wherein the sending context indicates that a time at which the selected digital payload is being shared is within a threshold duration of previous work activity or previous personal activity on the computing system.

13. The computing system of claim 10, wherein the sending context indicates that the selected digital payload is being shared from a work-designated computing device or a personal-designated computing device.

14. The computing system of claim 10, wherein the sending context indicates that the selected digital payload is being shared using a work-designated identity or a personal-designated identity.

15. The computing system of claim 10, wherein the sending context indicates that the selected payload is being shared during computing activity with a work-designated contact or a personal-designated contact.

16. A computing device, comprising:
a network interface communicatively coupling the computing device to one or more remote computing devices;
a processor; and
memory holding instructions executable by the processor to instantiate:
a storage controller configured to access a plurality of network-sharable digital payloads, each of the plurality of digital payloads associated with a plurality of access tags including one or more content tags and one or more context tags;

a protection service configured to automatically determine whether a prospective recipient computing device of a selected digital payload has a work designation or a personal designation that is inconsistent with one or more of a context indicated by the one or more context tags, a sending context indicating that the selected digital payload is being shared from a work-designated computing device or a personal designated computing device, and a content indicated by the one or more content tags for the selected digital payload, or whether the prospective recipient computing device of the selected digital payload has a work designation and a personal designation that is consistent with all contexts indicated by the one or more context tags, the sending context, and all contents indicated by the one or more content tags; and a sharing tool configured to send the selected digital payload to the prospective recipient computing device contingent on the prospective recipient computing device having the work designation and the personal designation that is consistent with all contexts indicated by the one or more context tags, the sending context, and all contents indicated by the one or more content tags, the sharing tool further configured to protect the selected digital payload from being sent to the prospective recipient computing device if the prospective recipient computing device has the work designation or the personal designation that is inconsistent with one or more of the context indicated by the one or more context tags, the sending context, and the content indicated by the one or more content tags.

17. The computing device of claim 16, wherein the protection service is configured to protect the selected digital payload from being sent by automatically blocking the selected digital payload from being sent to the prospective recipient.

18. The computing device of claim 16, wherein the protection service is configured to protect the selected digital payload from being sent by automatically delaying the selected digital payload from being sent to the prospective recipient until a sending user overrides a warning.

19. A method, comprising:

automatically determining whether a prospective recipient computing device of a selected digital payload has a work designation or a personal designation that is inconsistent with one or more of a context indicated by one or more context tags, a sending context indicating that the selected digital payload is being shared from a work-designated computing device or a personal designated computing device, and a content indicated by one or more content tags for the selected digital payload, or whether the prospective recipient computing device of the selected digital payload has a work designation and a personal designation that is consistent with all contexts indicated by the one or more context tags, the sending context, and all contents indicated by the one or more content tags; and sending the selected digital payload to the prospective recipient computing device if the prospective recipient computing device has the work designation and the personal designation that is consistent with all contexts indicated by the one or more context tags, the sending context, and all contents indicated by the one or more content tags; and protecting the selected digital payload from being sent to the prospective recipient computing device if the prospective recipient computing device has the work designation or the personal designation that is inconsistent with one or more of the context indicated by the one or more context tags, the sending context, and the content indicated by the one or more content tags.

* * * * *